(12) United States Patent
Jamison et al.

(10) Patent No.: US 9,117,169 B2
(45) Date of Patent: Aug. 25, 2015

(54) METHODS AND APPARATUSES FOR MODELING SHALE CHARACTERISTICS IN WELLBORE SERVICING FLUIDS USING AN ARTIFICIAL NEURAL NETWORK

(75) Inventors: Dale E. Jamison, Humble, TX (US); Shadaab S. Maghrabi, Pune (IN); Dhanashree Gajanan Kulkarni, Pune (IN); Kushabhau D. Teke, Pune (IN); Sandeep D. Kulkarni, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 464 days.

(21) Appl. No.: 13/480,245

(22) Filed: May 24, 2012

(65) Prior Publication Data

US 2013/0318019 A1 Nov. 28, 2013

(51) Int. Cl.
*G06N 3/02* (2006.01)
*G06N 3/04* (2006.01)
*G06N 3/08* (2006.01)

(52) U.S. Cl.
CPC .. *G06N 3/02* (2013.01); *G06N 3/04* (2013.01); *G06N 3/08* (2013.01)

(58) Field of Classification Search
CPC .............. G06N 3/02; G06N 3/04; G06N 3/08
USPC ........................................................ 706/25
See application file for complete search history.

(56) References Cited

U.S. PATENT DOCUMENTS 6,732,052 B2 * 5/2004 Macdonald et al. .............. 702/6

OTHER PUBLICATIONS

Chenevert et alia. Shale/Mud Inhibition Defined With Rig-Site Methods. SPE Drilling Engineering, pp. 261-268, Sep. 1989.*
Fink. Petroleum Engineer's Guide to Oil Field Chemicals and Fluids. pp. 785. May 13, 2011.*
Deville et alia. Development of Water-Based Drilling Fluids Customized for Shale Reservoirs. SPE Drilling & Completion, Dec. 2011.*
Doostmohammadi et alia. Modeling the Complex and Long Term Swelling Behavior of Argillaceous Rocks. Mining Science and Technology (China) vol. 21, pp. 655-659, Nov. 2011.*
Erzin et alia. The Prediction of Swell Percent and Swell Pressure by Using Neural Networks. Mathematical and Computational Applications, vol. 16, No. 2, pp. 425-436, 2011.*
Halliburton, Worldwide Baroid Laboratories. 2010.*

(Continued)

*Primary Examiner* — Jeffrey A Gaffin
*Assistant Examiner* — Robert H Bejcek, II
(74) *Attorney, Agent, or Firm* — Anthony P. Iannitelli; Baker Botts L.L.P.

(57) ABSTRACT

An apparatus and method for determining a formation/fluid interaction of a target formation and a target drilling fluid is described herein. The method may include training an artificial neural network using a training data set. The training data set may include a formation characteristic of a source formation and a fluid characteristic of a source drilling fluid and experimental data on source formation/fluid interaction. Once the artificial neural network is trained, a formation characteristic of the target formation and fluid characteristic of target drilling fluid may be input. The formation characteristic of the target formation may correspond to the formation characteristic of the source formation. The fluid characteristic of the target drilling fluid may correspond to the fluid characteristic of the source drilling fluid. A formation/fluid interaction of the target formation and the target drilling fluid may be determined using a value output by the artificial neural network.

17 Claims, 16 Drawing Sheets

(56) References Cited

OTHER PUBLICATIONS

Ikizler et alia. Prediction of Swelling Pressures of Expansive Soils Using Artificial Neural Networks. Advances in Engineering Software, vol. 41, pp. 647-655, 2010.*

Onal. Swelling and Cation Exchange Capacity Relationship for the Samples Obtained from a Bentonite by Acid Activations and Heat Treatment. Applied Clay Science, vol. 37, pp. 74-80, 2007.*

Khodja, Mohamed et al., "Drilling Fluid Technology: Performances and Environmental Considerations" in "Products and Services; from R&D to Final Solutions" (Nov. 2, 2010) Sciyo, pp. 232-240.

Yan, Jienian et al., "Mechnanisms and Effective Prevention of Damage for Formations with Low-Porosity and Low-Permeability" in "Earth Sciences" (Feb. 3, 2012) InTech, pp. 225-240.

International Search Report and Written Opinion issued in related PCT Application No. PCT/US2013/041665 mailed Nov. 11, 2013, 13 pgs.

International Preliminary Report on Patentabilityi ssued in related PCT Application No. PCT/US2013/041665 mailed Dec. 4, 2014, 11 pgs.

* cited by examiner

| Shale Type | London Clay (LC) | Pierre Shale I (PSI) | Pierre Shale II (PSII) | Bentonite I | Bentonite II | Revdust |
|---|---|---|---|---|---|---|
| Quartz, wt % | 22 | 34 | 28 | 7 | 7 | 16 |
| Calcite, wt % | - | 2 | - | 3 | - | - |
| Potassium Feldspar, wt % | 1 | - | - | - | - | 1 |
| Dolomite | 1 | 6 | 1 | - | - | 1 |
| Plagioclase Feldspar, wt % | - | 2 | 2 | - | - | 1 |
| Pyrite | - | 1 | 1 | - | - | 0 |
| Smectite, wt % | 28 | 27 | 43 | 90 | 85 | 82 |
| Illite, wt % | 38 | 26 | 21 | - | 8 | - |
| Kaolin, wt % | 6 | 0 | - | - | - | - |
| Chlorite, wt % | 4 | 2 | 4 | - | - | - |
| Siderite, wt % | - | - | - | - | - | - |
| Corrensite, wt % (1:1 smectite and chlorite layer) | - | - | - | - | - | - |
| Total clay gm/100gm | 76 | 55 | 68 | 90 | 93 | - |

*FIG. 3a*

| Shale Type | London Clay (LC) | Pierre Shale I (PSI) | Pierre Shale II (PSII) | Bentonite I | Bentonite II | Revdust |
|---|---|---|---|---|---|---|
| CEC meq/100g | 22 | 18 | 24 | 48 | 60 | 34 |
| Na mg/100 gm | 73 | 177.4 | 594 | 895.5 | 1242.5 | 78.5 |
| K mg/100 gm | 77 | 57.6 | 83 | 9.2 | 55.3 | 30.2 |
| Ca mg/100 gm | 475 | 229.5 | 238 | 423.3 | 512.2 | 854 |
| Mg mg/100 gm | 247 | 52.9 | 13 | 228.1 | 154.1 | 54.6 |

*FIG. 3b*

| Shale type | PSI | PSII |
|---|---|---|
| Smectite content | 27 | 43 |
| Mass fraction in shale no.11 | 0.2 | 0.8 |
| Calculated Smectite | 27*0.2 + 43*0.8= 39.8% ||
| Experimental Smectite | 42 % ||

*FIG. 4a*

| Shale type | PSI | PSII |
|---|---|---|
| Illite content | 26 | 21 |
| Mass fraction in shale no.11 | 0.2 | 0.8 |
| Calculated Illite | 26*0.2 + 21*0.8= 22% ||
| Experimental Illite | 20 % ||

*FIG. 4b*

| Sr. No. | Smectite, wt % | Illite, wt % | CEC meq/100g | Na mg/100 g | Ca mg/100 g | Total clay g/100g | A @ 24%NaCl |
|---|---|---|---|---|---|---|---|
| 1 | 54.8 | 18.8 | 33.4 | 598.5 | 375.8 | 76.4 | 31.0 |
| 2 | 53.8 | 20.2 | 35.8 | 665.9 | 393.4 | 77.0 | 33.0 |
| 3 | 46.2 | 22.8 | 28.6 | 536.2 | 338.5 | 72.0 | 27.6 |
| 4 | 36.8 | 25.4 | 21.4 | 406.5 | 283.7 | 67.0 | 22.6 |
| 5 | 48.2 | 19.4 | 30.0 | 640.4 | 291.1 | 70.4 | 27.4 |
| 6 | 65.0 | 14.2 | 44.4 | 899.8 | 433.9 | 80.4 | 37.8 |
| 7 | 42.2 | 26.2 | 27.2 | 432.0 | 395.9 | 73.6 | 29.2 |
| 8 | 33.8 | 28.8 | 20.0 | 302.3 | 331.1 | 68.6 | 23.0 |
| 9 | 30.8 | 32.2 | 18.8 | 198.1 | 378.5 | 70.2 | 23.4 |
| 10 | 27.6 | 36.8 | 17.2 | 93.9 | 425.9 | 71.6 | 23.8 |
| 11 | 39.8 | 22.0 | 23.8 | 510.7 | 236.3 | 65.4 | 22.2 |
| 12 | 73.4 | 11.8 | 51.6 | 1029.6 | 455.7 | 85.4 | 43.0 |
| 13 | 43.0 | 23.6 | 27.4 | 452.9 | 336.9 | 69.4 | 24.0 |
| 14 | 33.8 | 26.4 | 20.2 | 323.2 | 282.0 | 64.4 | 18.8 |
| 15 | 30.6 | 29.8 | 18.8 | 219.0 | 329.4 | 66.0 | 19.2 |
| 16 | 53.4 | 17.8 | 36.0 | 686.8 | 344.3 | 72.6 | 28.8 |
| 17 | 45.0 | 20.4 | 28.8 | 557.1 | 299.4 | 67.8 | 23.6 |
| 18 | 50.4 | 21.2 | 34.8 | 562.6 | 391.7 | 74.4 | 29.2 |
| 19 | 27.6 | 33.2 | 17.4 | 114.8 | 378.8 | 67.6 | 19.6 |
| 20 | 36.8 | 23.0 | 21.8 | 427.4 | 234.6 | 62.8 | 19.4 |
| 21 | 61.8 | 15.2 | 43.2 | 816.5 | 399.1 | 77.6 | 34.0 |
| 22 | 27.4 | 30.6 | 17.6 | 135.8 | 327.7 | 63.4 | 15.4 |
| 23 | 33.4 | 24.0 | 20.4 | 344.0 | 232.9 | 60.2 | 14.6 |
| 24 | 50.2 | 18.8 | 34.8 | 603.4 | 342.8 | 70.2 | 25.0 |
| 25 | 30.4 | 27.4 | 19.0 | 239.8 | 280.3 | 61.8 | 15.0 |

*FIG. 6b*

| Sr. No. | Water-- ppb | NaCl-- ppb | Barite-- ppb | YP | B | Smectite wt% | Illite wt% | CEC meq/100g | Total Clay g/100g | Na meq/100g | Ca meq/100g |
|---|---|---|---|---|---|---|---|---|---|---|---|
| 1 | 273.01 | 89.79 | 68.48 | 41 | 1.8 | 20 | 49 | 24 | 72 | 3.09 | 9.65 |
| 2 | 287.8 | 92.1 | 68.3 | 20 | 2.1 | 20 | 49 | 24 | 72 | 3.09 | 9.65 |
| 3 | 268.913 | 88.417 | 71.045 | 41 | 2.2 | 20 | 49 | 24 | 72 | 3.09 | 9.65 |
| 4 | 266.8 | 0 | 139.53 | 46 | 4.5 | 27 | 26 | 18 | 55 | 7.71 | 5.74 |
| 5 | 260.59 | 0 | 365.7 | 45 | 5.4 | 27 | 26 | 18 | 55 | 7.71 | 5.74 |
| 6 | 313 | 0 | 145.3 | 25 | 5.4 | 27 | 26 | 18 | 55 | 7.71 | 5.74 |
| 7 | 313 | 0 | 145.3 | 25 | 5.7 | 85 | 8 | 60 | 93 | 54.02 | 12.81 |
| 8 | 310.9 | 16.89 | 130.6 | 21 | 2.0 | 85 | 8 | 60 | 93 | 54.02 | 12.81 |
| 9 | 264.9 | 14.4 | 126.98 | 47 | 3.0 | 85 | 8 | 60 | 93 | 54.02 | 12.81 |
| 10 | 287.87 | 15.65 | 128.82 | 36 | 3.6 | 85 | 8 | 60 | 93 | 54.02 | 12.81 |
| 11 | 297.3 | 95.15 | 65.8 | 17 | 4.9 | 90 | 0 | 48 | 90 | 38.93 | 10.58 |
| 12 | 273.6 | 89.95 | 68.84 | 37 | 5.4 | 90 | 0 | 48 | 90 | 38.93 | 10.58 |
| 13 | 254.8 | 81.5 | 70.04 | 31 | 3.9 | 90 | 0 | 48 | 90 | 38.93 | 10.58 |
| 14 | 282.66 | 90.45 | 67.29 | 36 | 4.5 | 27 | 26 | 18 | 55 | 7.71 | 5.74 |
| 15 | 271.25 | 86.8 | 70.31 | 31 | 4.6 | 27 | 26 | 18 | 55 | 7.71 | 5.74 |
| 16 | 266 | 85.12 | 70.13 | 29 | 6.1 | 27 | 26 | 18 | 55 | 7.71 | 5.74 |
| 17 | 286.8 | 0 | 255.4 | 32 | 3.7 | 43 | 21 | 24 | 68 | 25.8 | 5.94 |
| 18 | 310.9 | 16.89 | 130.6 | 21 | 3.7 | 68 | 9.4 | 46.6 | 78.2 | 45.5 | 10.70 |
| 19 | 310.9 | 16.89 | 130.6 | 21 | 7.7 | 4.86 | 4.68 | 5.7 | 79.9 | 1.38 | 1.03 |
| 20 | 310.9 | 16.89 | 130.6 | 21 | 13.2 | 4.86 | 4.68 | 5.7 | 79.9 | 1.38 | 1.03 |
| 21 | 310.9 | 16.89 | 130.6 | 21 | 4.1 | 4.86 | 4.68 | 5.7 | 79.9 | 1.38 | 1.03 |

*FIG. 8b*

| Sr. No. | NaCl- ppb | Shale stabilizers (ppb) | | | | YP | % Recovery-Shale erosion(Dried) | A % | Hardness |
|---|---|---|---|---|---|---|---|---|---|
| | | GEM CP | CLAYSEAL PLUS | PERFORMATROL | BORE HIB | | | | |
| 1 | 89.8 | 10.0 | 7.0 | 0.0 | 10.0 | 41.0 | 105.0 | 24.2 | 5.7 |
| 2 | 92.1 | 5.0 | 0.0 | 5.0 | 0.0 | 20.0 | 106.0 | 30.2 | 5.7 |
| 3 | 88.4 | 10.0 | 5.0 | 10.0 | 5.0 | 41.0 | 105.0 | 27.0 | 5.7 |
| 4 | 85.8 | 5.0 | 5.0 | 15.0 | 10.0 | 42.0 | 107.0 | 29.7 | 5.7 |
| 5 | 95.2 | 0.0 | 0.0 | 0.0 | 0.0 | 17.0 | 96.0 | 12.7 | 18.9 |
| 6 | 0.0 | 0.0 | 0.0 | 0.0 | 0.0 | 25.0 | 81.0 | 28.3 | 18.9 |
| 7 | 0.0 | 0.0 | 0.0 | 0.0 | 0.0 | 45.0 | 96.0 | 19.4 | 10.8 |
| 8 | 0.0 | 0.0 | 0.0 | 0.0 | 0.0 | 25.0 | 77.0 | 11.1 | 10.8 |
| 9 | 15.5 | 0.0 | 0.0 | 0.0 | 0.0 | 35.0 | 81.0 | 35.3 | 5.7 |
| 10 | 18.3 | 0.0 | 0.0 | 0.0 | 0.0 | 13.0 | 34.0 | 40.5 | 5.7 |
| 11 | 14.4 | 15.0 | 7.0 | 15.0 | 15.0 | 47.0 | 101.0 | 14.3 | 10.8 |
| 12 | 0.0 | 0.0 | 0.0 | 0.0 | 0.0 | 14.0 | 59.0 | 53.8 | 12.8 |
| 13 | 0.0 | 0.0 | 0.0 | 0.0 | 0.0 | 15.0 | 79.8 | 15.0 | 10.8 |
| 14 | 0.0 | 0.0 | 1.0 | 1.0 | 0.0 | 13.0 | 80.5 | 15.0 | 10.8 |
| 15 | 0.0 | 0.0 | 0.0 | 0.0 | 1.0 | 16.0 | 66.7 | 15.0 | 10.8 |
| 16 | 0.0 | 3.5 | 0.0 | 0.0 | 0.0 | 14.0 | 79.0 | 15.0 | 10.8 |
| 17 | 0.0 | 0.0 | 3.5 | 0.0 | 0.0 | 14.0 | 91.9 | 15.0 | 10.8 |
| 18 | 0.0 | 0.0 | 0.0 | 3.5 | 0.0 | 14.0 | 82.5 | 15.0 | 10.8 |
| 19 | 0.0 | 0.0 | 0.0 | 0.0 | 3.5 | 16.0 | 77.9 | 15.0 | 10.8 |
| 20 | 0.0 | 1.0 | 0.0 | 0.0 | 0.0 | 14.0 | 75.4 | 53.0 | 12.8 |
| 21 | 0.0 | 0.0 | 0.0 | 0.0 | 1.0 | 16.0 | 62.4 | 53.0 | 12.8 |
| 22 | 0.0 | 3.5 | 0.0 | 0.0 | 0.0 | 14.0 | 83.3 | 53.0 | 12.8 |
| 23 | 0.0 | 0.0 | 3.5 | 0.0 | 0.0 | 14.0 | 72.7 | 53.0 | 12.8 |
| 24 | 0.0 | 0.0 | 0.0 | 0.0 | 0.0 | 14.0 | 59.9 | 53.0 | 12.8 |
| 25 | 0.0 | 0.0 | 0.0 | 0.0 | 3.5 | 16.0 | 68.8 | 53.0 | 12.8 |

FIG. 9b

METHODS AND APPARATUSES FOR MODELING SHALE CHARACTERISTICS IN WELLBORE SERVICING FLUIDS USING AN ARTIFICIAL NEURAL NETWORK

BACKGROUND

The present disclosure relates generally to modeling formation characteristics, and, more particularly, the present disclosure relates to methods and apparatuses for modeling shale/fluid interaction in wellbore servicing fluids using an artificial neural network. The wellbore servicing fluids may include, for example, fracturing fluids, completion fluids and drilling fluids, such as water based muds (WBMs).

Historically, shale instability has been a big challenge while drilling with WBMs. This shale instability leads to sloughing of shales, bore hole collapse, stuck-pipe and disintegration of shale, which leads to an increase in fines (solids). The increase in fines can create problems in rheology control and also increase the low gravity solids concentrations leading to reduced rate of penetrations. These issues typically increase the drilling time and thereby the cost of the drilling operation.

Having knowledge of certain formation characteristics, including shale instability, can increase the efficiency of the drilling operations. Specifically, knowledge of shale formation characteristics can be used to optimize drilling fluids to minimize problems that may occur during drilling operations. Unfortunately, tests to determine some formation characteristics, such as shale swelling and erosion, can be time consuming, taking up to 72 hours. When attempting to optimize drilling fluid to the formation, often multiple tests must be run. These tests add time to the drilling process, particularly if the tests are run periodically throughout the drilling process.

FIGURES

Some specific exemplary embodiments of the disclosure may be understood by referring, in part, to the following description and the accompanying drawings.

FIGS. 3a and 3b shows example charts containing example formation characteristics, according to aspects of the present disclosure.

FIGS. 4a and 4b illustrate an example method for synthetic formation extrapolation, according to aspects of the present disclosure.

FIG. 6b illustrates an example training data set for use in the example method show in FIG. 6a, according to aspects of the present disclosure.

FIG. 8b illustrates an example training data set for use in the example method show in FIG. 8a, according to aspects of the present disclosure.

FIG. 9b illustrates an example training data set for use in the example method show in FIG. 9a, according to aspects of the present disclosure.

Figure 1:
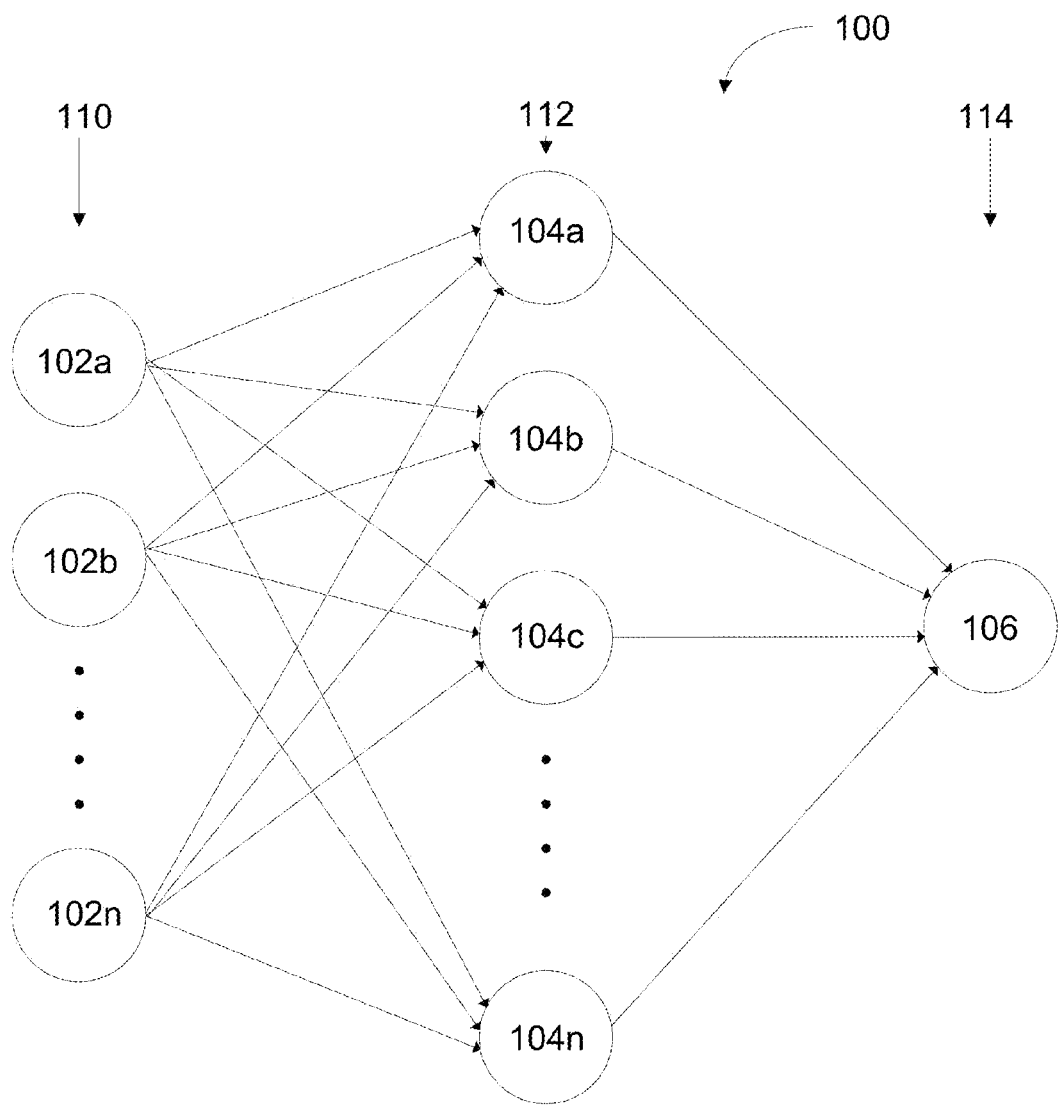
FIG. 1 illustrates an example artificial neural network, according to aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to modeling formation characteristics, and, more particularly, the present disclosure relates to methods and apparatuses for modeling shale/fluid interaction in wellbore servicing fluids using an artificial neural network.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

To facilitate a better understanding of the present disclosure, the following examples of certain embodiments are given. In no way should the following examples be read to limit, or define, the scope of the disclosure. Embodiments of the present disclosure may be applicable to horizontal, vertical, deviated, or otherwise nonlinear wellbores in any type of subterranean formation. Embodiments may be applicable to injection wells as well as production wells, including hydrocarbon and geothermal wells.

The following disclosure describes a system and method for modeling a subterranean formation using an artificial neural network ("ANN"). The ANN may be used to calculate a formation/fluid interaction of the formation and a wellbore servicing fluid. An example method may include training an ANN using a training data set. The training data set may comprises characteristics of a source formation, characteristics of the source fluid, and an experimentally determined formation/fluid interaction between the source formation and a source drilling fluid, as will be described below. A characteristic of a target formation, i.e. a formation for which information on a formation/fluid interaction is needed, may be input to the trained artificial neural network. The characteristic of the target formation may correspond to the characteristic of the source formation. For example, if a total clay content of the source formation is input into the ANN as part of the training process, the total clay content of the target formation may be input into the ANN. The artificial neural network may then output a value which may be used to determine a formation/fluid interaction of the target formation with a target drilling fluid, such as a water based mud. The formation/fluid interaction may include, for example, a shale swelling response or a shale erosion value of the target formation as well as slake durability, hardness, and capillary suction tests.

FIG. 1 illustrates the structure of an example ANN 100, which may be trained to model shale formation/drilling fluid interactions according to aspects of the present disclosure. The modeled interactions may then be used to optimize drilling fluids, according to aspects of disclosure that will be discussed below. The subterranean formation may include shale formations or other formations well known in the art. As will be described below, a trained ANN 100 may be used to determine a formation/fluid interaction between a target formation and a target drilling fluid, which otherwise would require a time-consuming test. In certain embodiments, as will be described below, ANN 100 may be trained to produce an output to determine a shale swelling response and a shale erosion response of a target shale formation.

As can be seen, the ANN 100 includes parallel connections between processing elements 102a-n, 104a-n, and 106, which may also be referred to as neurons. In certain embodiments, each neuron receives input signals, and based on an internal weighting system, produces a single output signal. The neurons may be organized into different layers. For example, in FIG. 1, the ANN 100 includes an input layer 110 comprising neurons 102-n, one or more hidden layers 112 comprising neurons 104a-n, and an output layer 114 comprising neuron 106. As can be seen, the number of neurons in each layer may vary depending on the amount of input variables and the number of values to be output by the ANN 100. The number of neurons in ANN 100 can be increased to reflect the desired complexity and activity for the formation/fluid interaction to be modeled. According to certain embodiments, each neuron may accept a different input variable corresponding to a formation or fluid characteristic. The neurons 104a-n of the hidden layer 112 may then each receive a value from each neuron 102a-n of the input layer 110 and generate a signal which is fed into a neuron 106 at the output layer 114, which generates an output signal or value. In certain other embodiments, there may be multiple hidden layers, with parallel connections between the hidden layers. Likewise, in certain embodiments, there may be multiple output neurons, depending on the number of output values to be calculated by the ANN 100.

Figure 2:
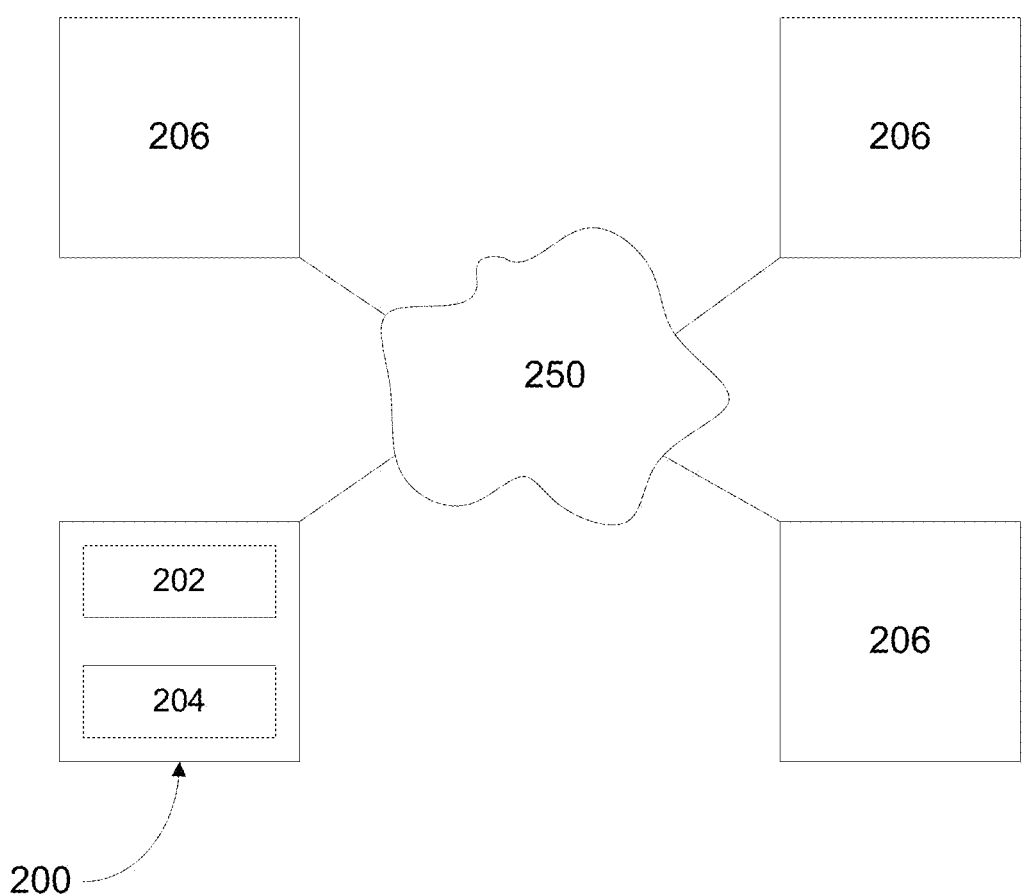
FIG. 2 illustrate an example computer system in which an artificial neural network may be implemented, according to aspects of the present disclosure.

In certain embodiments, the neurons of an ANN 100 may be physically constructed or simulated by a digital computer. For example, the neurons can be modeled using a processing element and memory in a single computer, or alternatively, some or all of the neurons may be implemented on separate computers, each connected to a network. An example computer 200 and network 250 can be found in FIG. 2. In particular, the computer 200 includes a processor 202 coupled to at least one memory element 204. The memory element 204 may include software components that direct the processor 202 to function as a neuron in an ANN. Additionally, computer 200 may communicate with other computers 206 over a network 250, through, for example, serial connections or network connections. The configuration of the computer and processor within an ANN configuration would be appreciated by one of ordinary skill in the art in view of this disclosure.

In operation, the neurons of example ANN 100 may begin with random weights for each input value. The ANN 100 may be trained using a training data set, including values that may be input into neurons on the input layer. In certain embodiments, the training data set may comprise formation characteristics of a source formation and fluid characteristics of a source drilling fluid, as will be described below. Based on the random weights, the ANN 100 may generate an output value. In certain embodiments, the training data set may also include a previously determined output value for the source formation and drilling fluid, such as an experimentally determined formation/fluid interaction. The weights for each neuron may then be trained by comparing the generated output value to the previously determined output value. The correct weightings may then be reinforced, decreasing the error in the ANN 100 until the error is within a predetermined threshold. Although one example ANN is described above with respect to FIG. 1, other ANN configurations are possible, as would be appreciated by one of ordinary skill in the art in view of this disclosure. Likewise, other training methods for an ANN are possible.

According to certain embodiments of the present disclosure, generating a training data set to train an ANN, such as ANN 100, to model formation/fluid interactions may include determining characteristics of a source formation. A source formation may include, for example, a native formation encountered and sampled during drilling or other subterranean operations. The characteristics may comprise values related to the chemistry of the source formation. FIGS. 3a and 3b illustrate example formation characteristic of different formations, including London Clay, Pierre Shale, Bentonite, and Revdust. The characteristics may include the composition of the formations by percentage weight of a particular element. For example, the formations may be characterized by percentage weight of Smectite, Illite, Kaolin, Chlorite, Quartz, Total Clay, Sodium, Calcium, Potassium, and Magnesium content, and other elements that would be appreciated by one of ordinary skill in the art in view of this disclosure. Additionally, the formations may be characterized by their Cation Exchange Capacity (CEC), and relative hardness. The hardness parameter may be determined using indentation hardness tests including Brinell, Rockwell, Vickers or Shore hardness tests. The indentation hardness may also be determined using hand-held force gauge assembly. Using the hand-held force gauge assembly method, the dried shale cuttings may be passed through a 5-mesh screen and retained on a 10-mesh screen. The hand held force gauge may be fixed with a cone shaped pointer. A sample of dried shale cutting may be placed on a pressurization implement, such as a car jack, which may be slowly engaged to crush the cuttings. The force required to crush the cuttings may then be recorded as a hardness parameter in pound-feet (lbf).

In certain embodiments, a source formation may also include a synthetic formation. The characteristics of synthetic formations may be determined by extrapolating the characteristics of two or more native formations. As can be seen in FIGS. 4a and 4b, one synthetic formation may comprise 20% of Pierre Shale I and 80% of Pierre Shale II from FIGS. 3a and 3b. The Smectite content of the synthetic formation may be extrapolated by calculating a weighted combination of the Smectite content of the two native formations, as can be seen in FIG. 4a. Likewise, the Illite content of the synthetic formation may be extrapolated by calculating a weighted combination of the Illite content of the two native formations, as can be seen in FIG. 4b. Similar extrapolation techniques can be applied to each of the formation characteristics shown in FIG. 3, as well as certain experimentally determined formation/fluid interactions, as will be described below. Advantageously, using synthetic formations may allow the training data set to be expanded without performing additional experiments.

An example training data set may further include a fluid characteristic of a source drilling fluid. Like the formation characteristics, the drilling fluid characteristics may be related to the chemistry and/or elemental composition of the source drilling fluid. Example drilling fluid characteristics may include a rheological parameter of the fluid, a shale stabilizer type used in the fluid, a shale stabilizer concentration, a salt type within the fluid, a salt concentration, a water concentration, and a weighting agent concentration and type. Rheological parameters of the fluid may include a yield point from the Bingham Plastic model, a yield stress from the Herschel Buckley model, or a shear stress at a corresponding shear rate. Other characteristics may be used as well, as would be appreciated by one of ordinary skill in the art in view of this disclosure.

According to certain embodiments of the present disclosure, generating a training data set to train an ANN, such as ANN 100, to model formation/fluid interactions may also include determining an experimental formation/fluid interaction of a source formation and a source drilling fluid. In certain embodiments, the experimental formation/fluid interaction may include an experimentally determined shale swelling response of a source shale formation and a source WBM. According to certain embodiments of the present invention, a Linear Swell Meter ("LSM"), such as the LSM available from Fann Instruments, may be used to generate the swelling response. As would be appreciated by one of ordinary skill in the art in view of this disclosure, determining the shale swelling response of a source shale formation may include drying and grinding native shale samples, passing the fines through a screen, homogenizing the sample with water, and placing the mixture in a cylindrical mold. The sample may be exposed to a source drilling fluid, such as a water-based drilling fluid, at a predetermined temperature, such as 150 degrees Fahrenheit. The percentage swelling of the sample with respect to time may then be measured using computerized software, and a representative formation/fluid interaction from the LSM may be generated. In certain embodiments an electronic Linear Variable Differential Transformer (LVDT) swell measuring system may be used. The data from the LVDT measurements may be processed by a dedicated computer system or program. This program may be capable of processing data from the multiple measuring heads, collecting, and enhancing data logging/graphics.

Figure 5B:
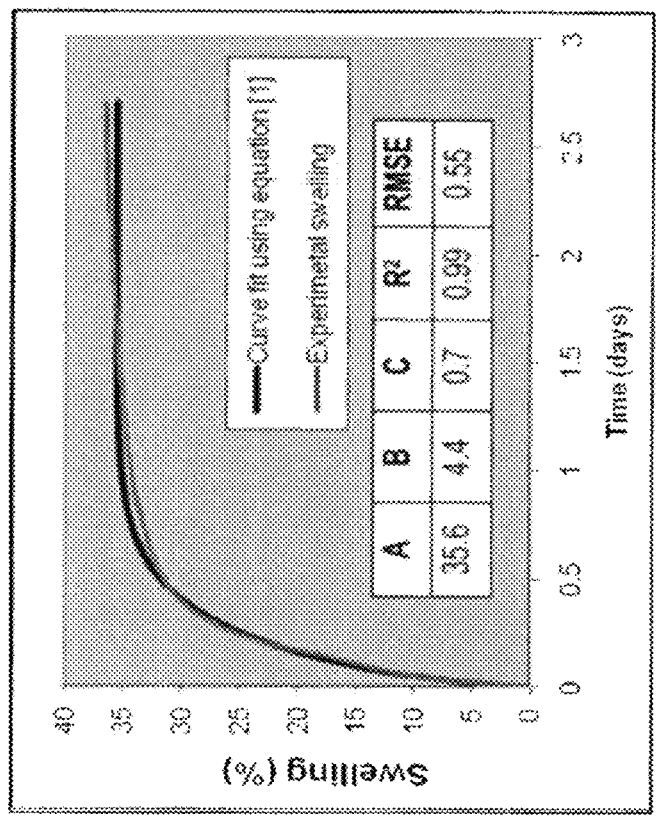
FIGS. 5a and 5b illustrate example swelling responses as a function of time of an example formation exposed to an example drilling fluid, according to aspects of the present disclosure.
Figure 5A:
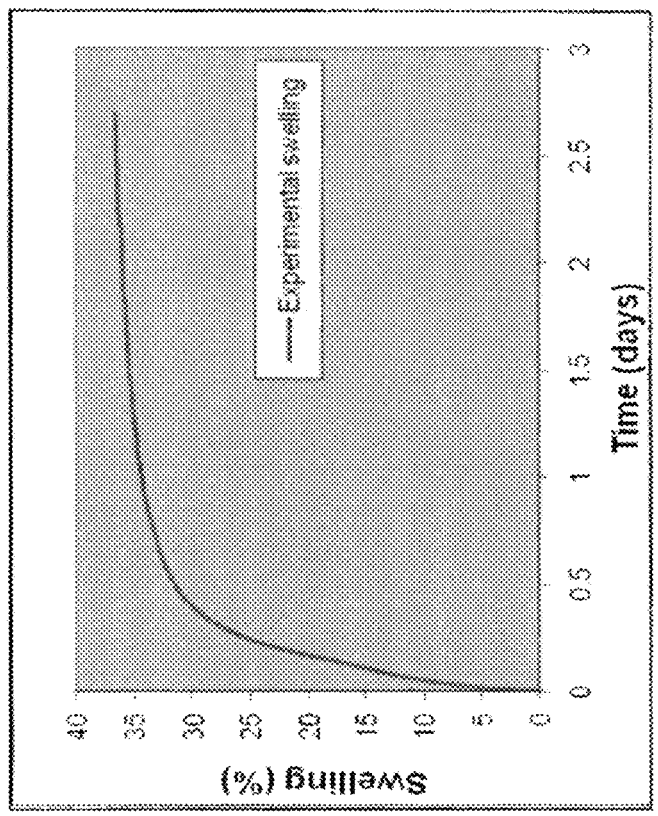

An example graph of the shale swelling percentage as a function of time can be seen in FIG. 5a. The graph in FIG. 5a was generated experimentally using a LSM for Pierre Shale II in an 11 ppg High Performance WBM formulation. FIG. 5b illustrates the time function of FIG. 5a versus a model curve generated using equation [1] below:

$$\% \ S(t) = A(1 - 1/(e^{(Bt)} + C\sqrt{t}))$$ equation [1]

Equation [1] may be used to model shale swelling as a function of time, according to aspects of the present invention. In equation [1], % S(t) represents the swelling of a formation at a time t, A represents the maximum swelling of the formation, B represents a first-order rate of swelling, and C represents the filtrate loss parameter. As can be seen from FIG. 5b, the model curve based on equation [1] may be fit to the experimental curve, with the given $R^2$ value and root-mean-square error ("RMSE") for the model curve versus the experimental curve. FIG. 5b also includes the values of parameters A, B, and C, determined by curve-fitting equation [1] to the experimentally determined swelling response. This may be accomplished, for example, using known algorithms that would be appreciated by one of ordinary skill in view of this disclosure. Each of the parameters A, B, and C, determined using the experimentally derived data, may be included in a training data set. Alternatively other methods to determine swelling potential in shale's may be used which may measure the weight increase or volume increase of shale's upon swelling.

In certain embodiments, the experimental formation/fluid interaction may include an experimentally determined percentage shale recovery for a source shale formation and a source drilling fluid. According to certain embodiments, the percentage shale recovery may be determined using a shale erosion test. The shale erosion test may include a source shale sample that is screened to obtain particles that pass through a 5-mesh screen, but are retained on a 10-mesh screen. A mass, such as 30 grams, of shale cuttings may be put into a source drilling fluid. The source drilling fluid may then be hot rolled at a predetermined temperature, such as 150° F., for a predetermined period of time, such as 16 hours, in a pint jar and then screened through a 10-mesh screen. The solids retained on the 10-mesh screen may then washed with 5% Potassium chloride solution to remove any adhered mud solids on the surface of shale cuttings followed by washing lightly and briefly to remove salt. The cuttings are then removed on dry absorbent paper, transferred into preweighed petri dish and dried in oven at 105° C. for overnight, cooled in a desiccator, and weighed. The percent erosion may be calculated based on the measured weight loss.

Figure 6A:
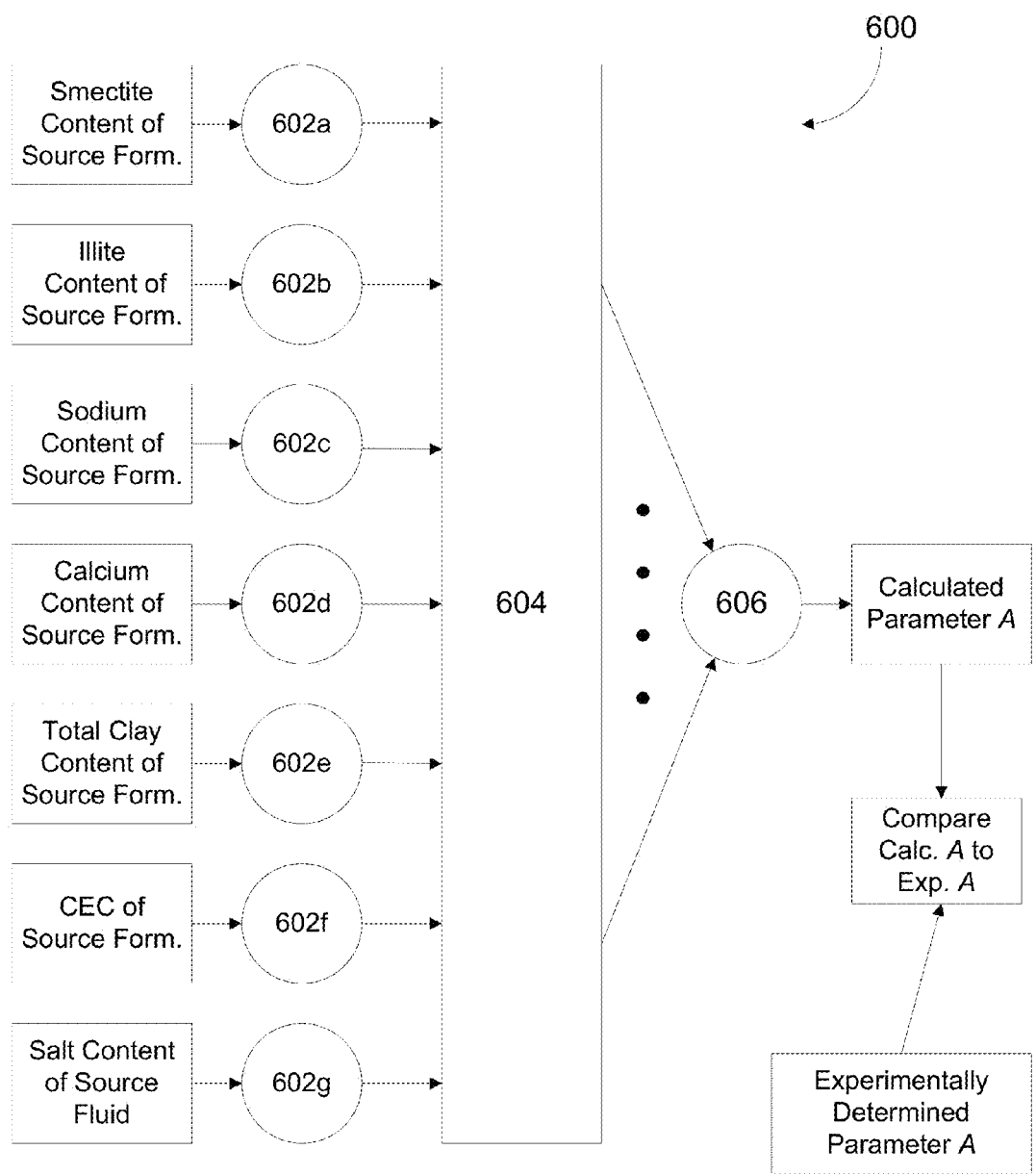
FIG. 6a illustrates an example method for training an artificial neural network to generate a formation/fluid interaction parameter, according to aspects of the present disclosure.

According to certain embodiments of the present disclosure, an ANN can be trained to output the values of parameters A, B, and C from equation [1], using target formation and/or target drilling fluid characteristics as inputs, which can then be used to determine the swelling response of a target formation and target drilling fluid without requiring a LSM test. For example, as can be seen in FIG. 6a, ANN 600 may receive at input neurons 602a-f characteristics of the source formation comprising Smectite content, Illite content, Sodium content, Calcium content, Total Clay content and CEC, respectively, for each source formation in the data set, and for each set of inputs, the ANN 600 may output a calculated parameter A at output neuron 606. The ANN 600 may also receive as an input a characteristic of a source fluid, such as the salt content of a source drilling fluid at neuron 602g. The calculated parameter A may be compared to the experimentally determined parameter A and the internal weighting of the ANN 600 neurons may be reinforced or changed depending on if the values are similar. Layer 604 may include hidden neurons with parallel connections, similar to those shown in FIG. 1. An example training data set for the parameter A can be found in FIG. 6b. Although the training data set in FIG. 6b includes a limited number of entries, training data sets may include hundreds of entries corresponding to multiple source formations. Notably, the calculated parameter A may be compared with the experimentally determined parameter A from the training data set to identify accurate neuron weight.

Figure 6C:
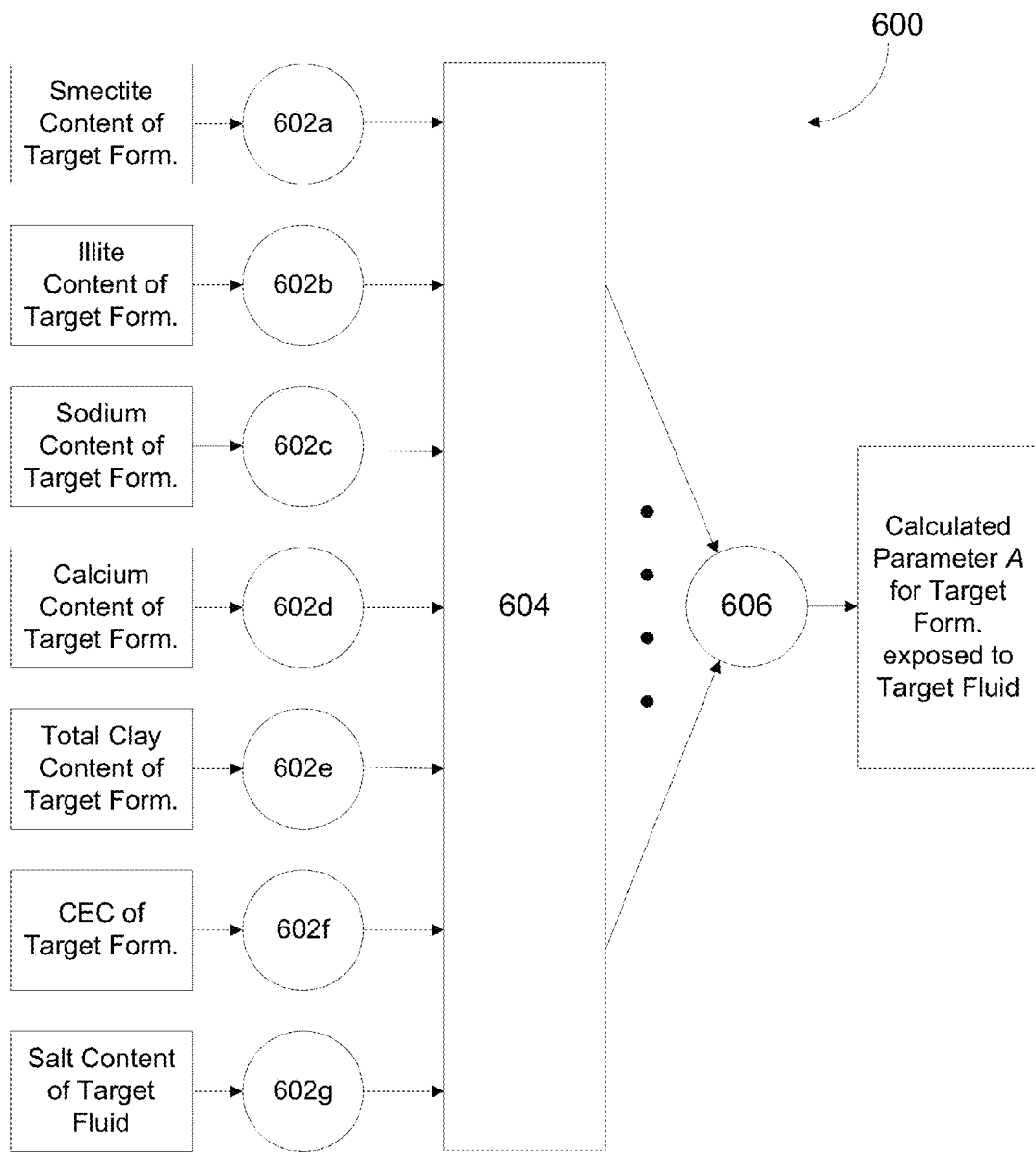
FIG. 6c illustrates a method for generating a formation/fluid interaction parameter of a target formation exposed to a target drilling fluid, according to aspects of the present disclosure.

Once the ANN 600 has been trained using the training data set for parameter A, the ANN 600 can be used to calculate the parameter A for a target formation. As can be seen in FIG. 6c, characteristics of the target formation corresponding to the characteristics of the source formation used to train the ANN may be input into neurons 602a-f. In particular, the Smectite content, Illite content, Sodium content, Calcium content, Total Clay content and CEC of the target formation may be input to the same neurons 602a-f that the characteristics of the source formation were. Likewise, the salt content of a target drilling fluid may be input at neuron 602g. Once the characteristics are input, the output node 606 of the ANN 600 may output a parameter A corresponding to the target formation.

In certain embodiments, the calculated parameter A from FIG. 6 may be used as part of a calculation to optimize a formation/fluid interaction. Optimizing the formation/fluid interaction may include altering at least one fluid characteristic, such as salt content, of the target drilling fluid based, at least in part, on a calculated formation/fluid interaction. For example, the calculated parameter A may be plugged into equation [1] (when B is known) to generate the shale swelling percentage of the formation when subjected to the target drilling fluid. If the shale swelling percentage of the formation falls outside of threshold values, for example, the target drilling fluid may be altered to optimize the formation fluid interaction. For example, the characteristics of the target drilling fluid may be tweaked and run through the ANN 600 again. The two values can then be compared, to determine which target drilling fluid provides the best formation/fluid interaction with the target formation. Multiple iterations of ANN calculations can be used to determine an optimized target drilling fluid configuration, at which point the target drilling fluid can be mixed and introduced downhole. In certain embodiments, the target drilling fluid may be altered in real time, through a feedback measurement system.

Figure 7A:
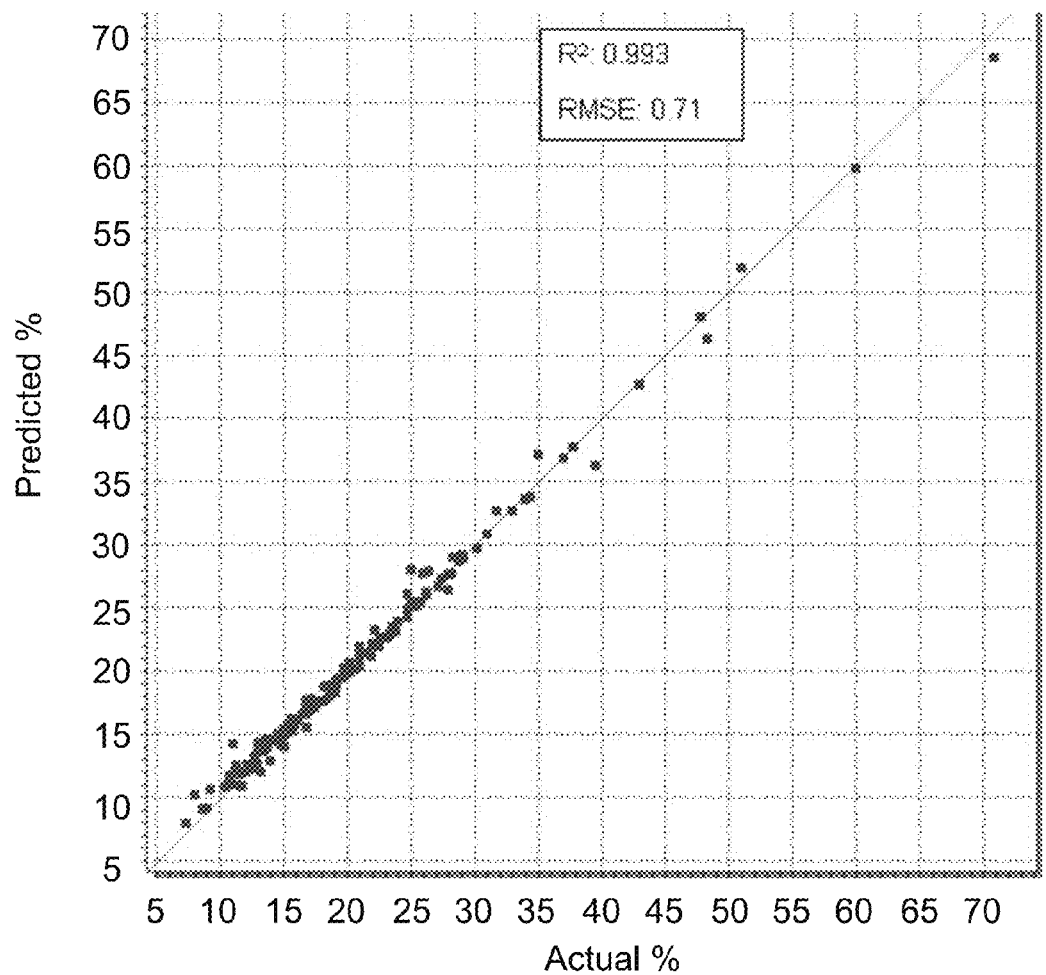
FIG. 7a illustrates a graph of training with the ANN for the calculated/predicted swelling volume of a formation versus the actual swelling volume.
Figure 7B:
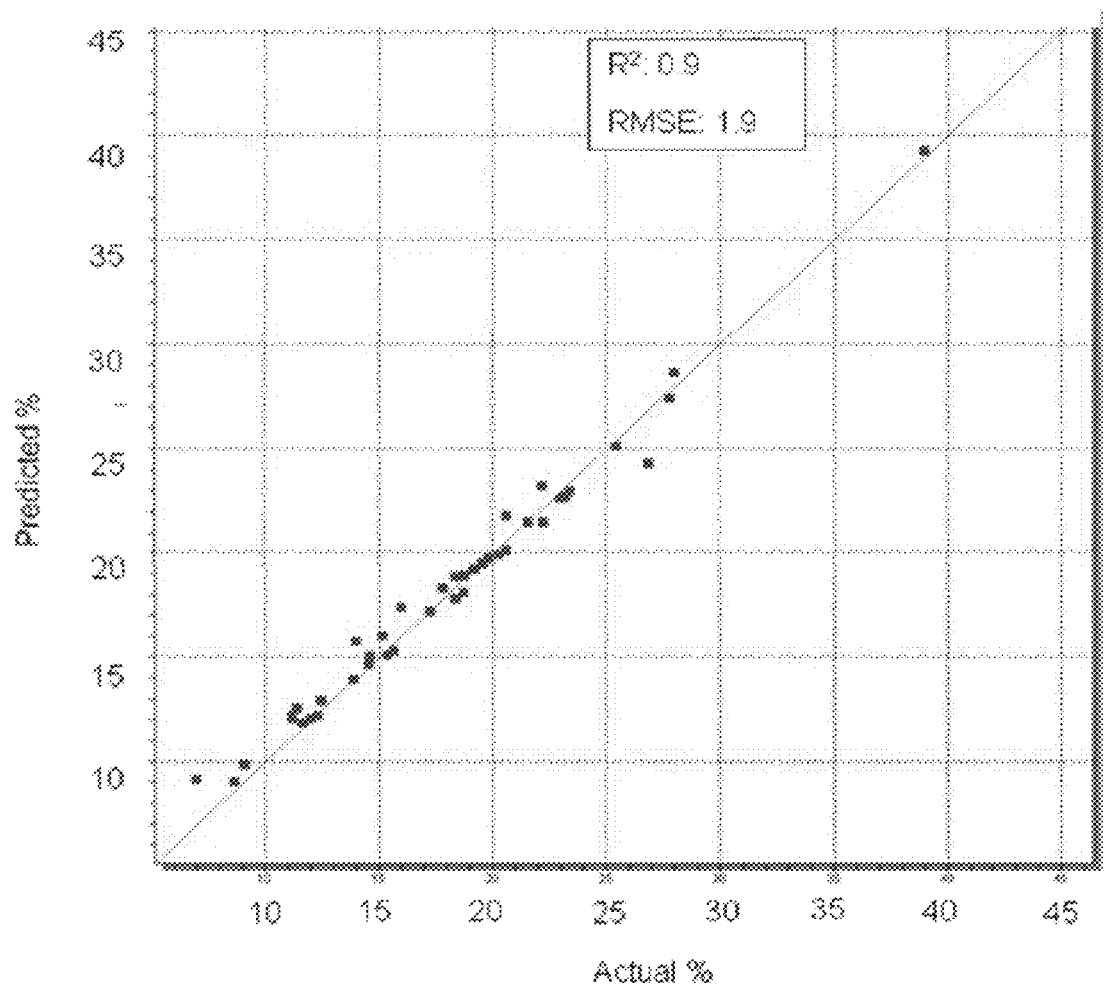
FIG. 7b illustrates a graphs of application of the trained model to out of sample set for calculated/predicted swelling volume of a formation versus the actual swelling volume.

FIGS. 7a and 7b illustrate example charts showing the predicted versus actual A value of equation [1] for a given formation/fluid interaction. In particular, the ANN was trained to use the inputs shown in FIGS. 6a-c: Smectite, Illite, CEC, Sodium, Calcium, and Total Clay, and trained to output the value A at 24% NaCl salt concentration in the fluid. Although salt is not included as an input for the chart in FIGS. 7a and 7b, salt may be used as an input in other embodiments, as described above. FIG. 7a in particular illustrates an example predicted value A for the sample datasets that is used for training the ANN; the figure illustrates that the A value calculated by the ANN falls close to the measured A value, with an $R^2$ value of 0.993, and a RMSE of 0.71. FIG. 7b in particular illustrates an example predicted value A for the sample datasets that are not used for training ANN (out of sample dataset or OSS); the figure shows that even for OSS the A value calculated by the ANN falls close to the measured A value, with an $R^2$ value of 0.9, and a RMSE of 1.9.

Figure 8A:
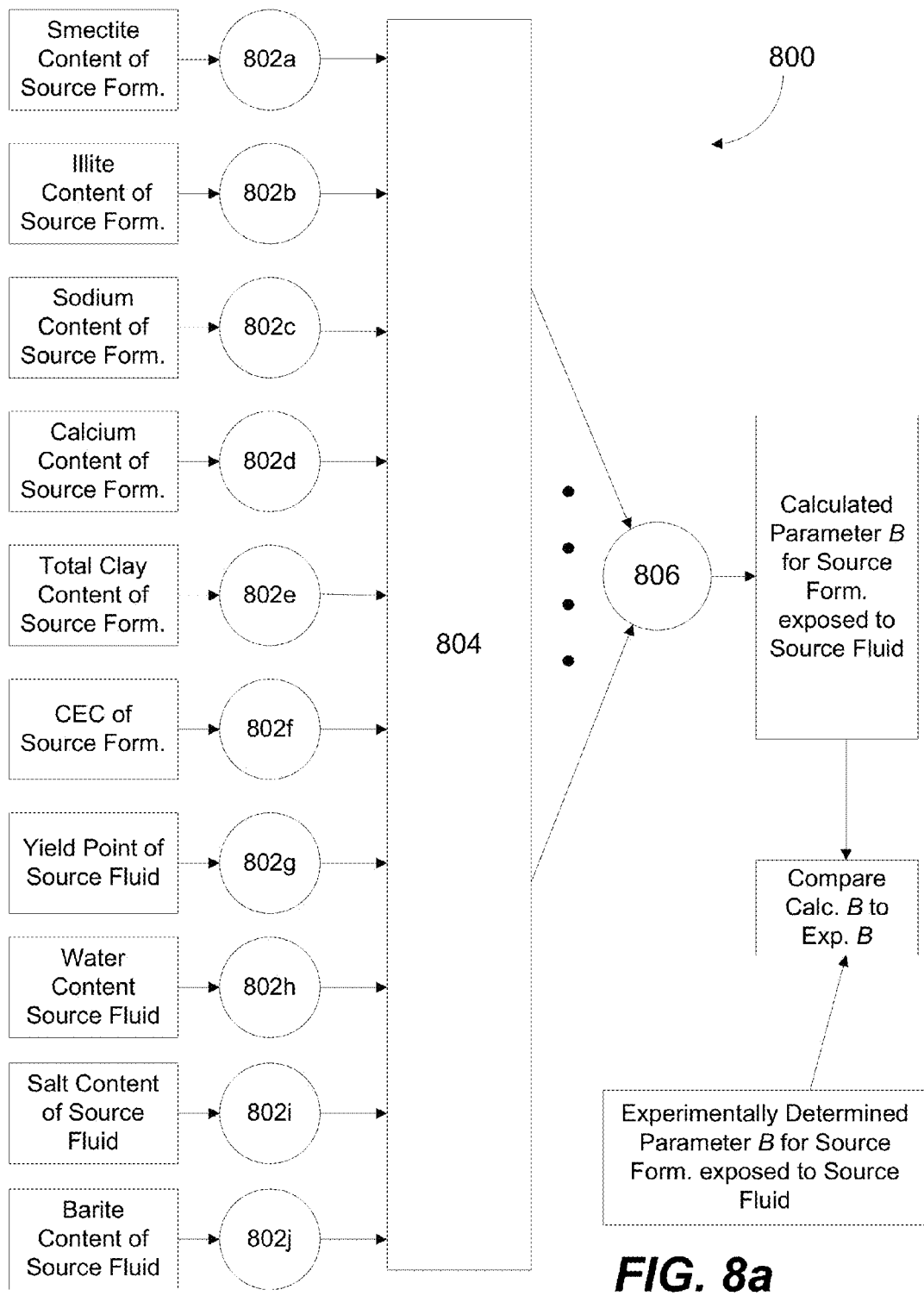
FIG. 8a illustrates an example method for training an artificial neural network to generate a formation/fluid interaction parameter, according to aspects of the present disclosure.

In certain embodiments, an ANN may also be trained to output a calculated value for parameter B. For example, as can be seen in FIG. 8a, ANN 800 may receive at input neurons 802a-f characteristics of the source formation comprising Smectite content, Illite content, Sodium content, Calcium content, Total Clay content and CEC, respectively. In addition, ANN 800 may receive at input neurons 802g-j characteristics of a source drilling fluid, including the yield point of the source drilling fluid, the water content of the source drilling fluid, the salt content of the source drilling fluid, and the barite content of the source drilling fluid. Notably, each of the source formation characteristics and the source drilling fluid characteristics may be included in a training data set for parameter B, as can be seen in FIG. 8b. The training data set for parameter B may also include an experimentally determined value of B, as described above, for each source formation/source drilling fluid combination in the training data. Layer 804 may include hidden neurons with parallel connections, similar to those shown in FIG. 1. For each set of inputs, the ANN 800 may output a calculated parameter B at output neuron 806. The calculated parameter B may be compared with the experimentally determined parameter B from the training data set to identify accurate neuron weight. In certain embodiments, ANN 600 and ANN 800 may be the same ANN, with the ANN calculating the appropriate parameter depending on the input neurons receiving input data.

Figure 8C:
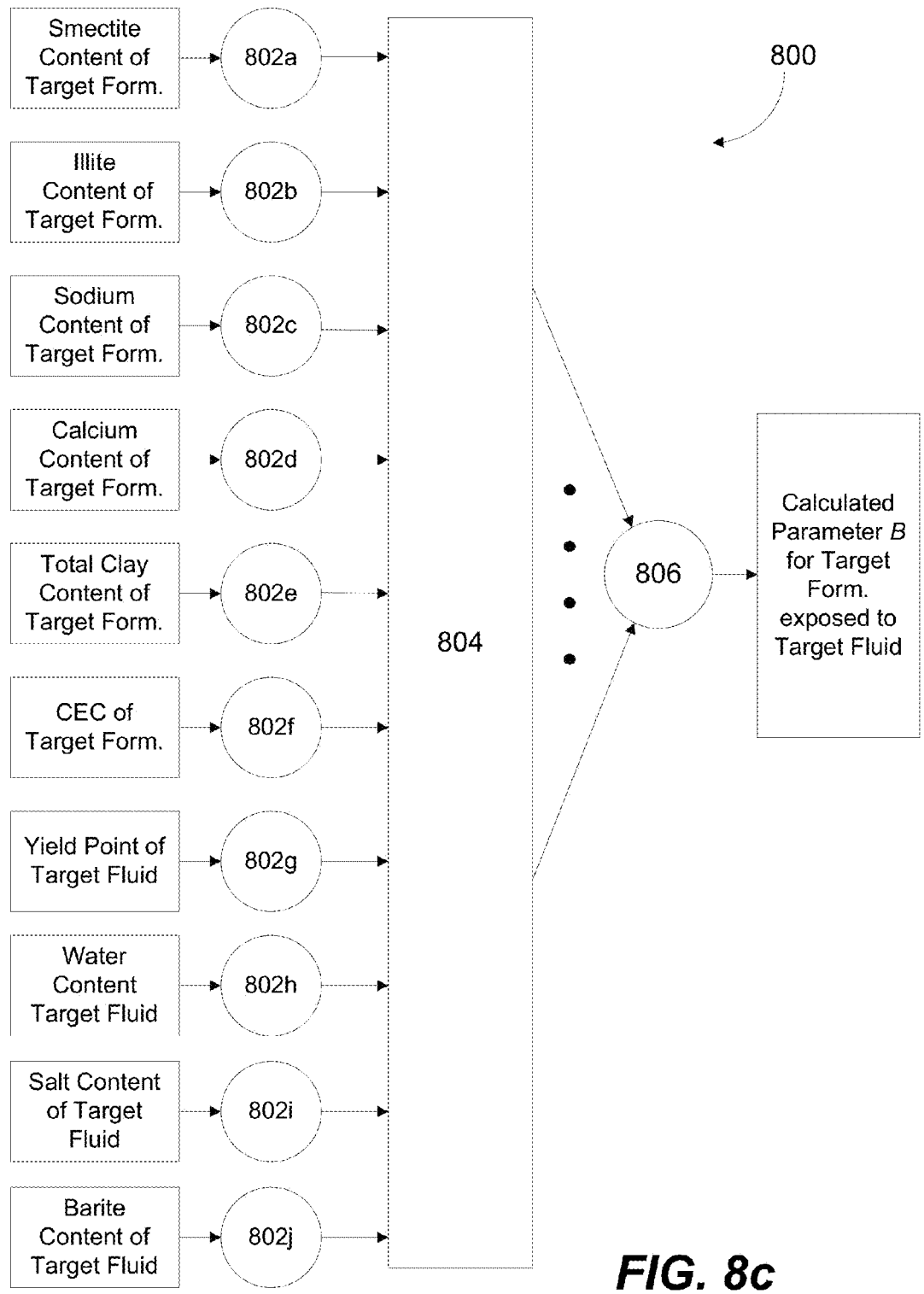
FIG. 8c illustrates a method for generating a formation/fluid interaction parameter of a target formation exposed to a target drilling fluid, according to aspects of the present disclosure.

Once the ANN 800 has been trained using the training data set for parameter B, the ANN 800 can be used to calculate the parameter B for a target formation and a target drilling fluid. As can be seen in FIG. 8c, characteristics of the target formation and drilling fluid corresponding to the characteristics of the source formation and drilling used to train the ANN may be input into neurons 802a-j, as described above with respect to ANN 600. Once the characteristics are input, the output node 806 of the ANN 800 may output a parameter B corresponding to the target formation and target drilling fluid. Advantageously, by altering the parameters of the target drilling fluid input to the ANN 800, the formation/fluid interaction of a target formation with different target drilling fluids can be determined in real time, decreasing the time and effort to optimize the formation/fluid interaction. In certain embodiments, the value of parameter C in equation [1] may vary between 0 to 1, but in most cases may have little impact on the overall linear swell profile for a given shale. As such, C may not need to be calculated by an ANN.

Figure 9A:
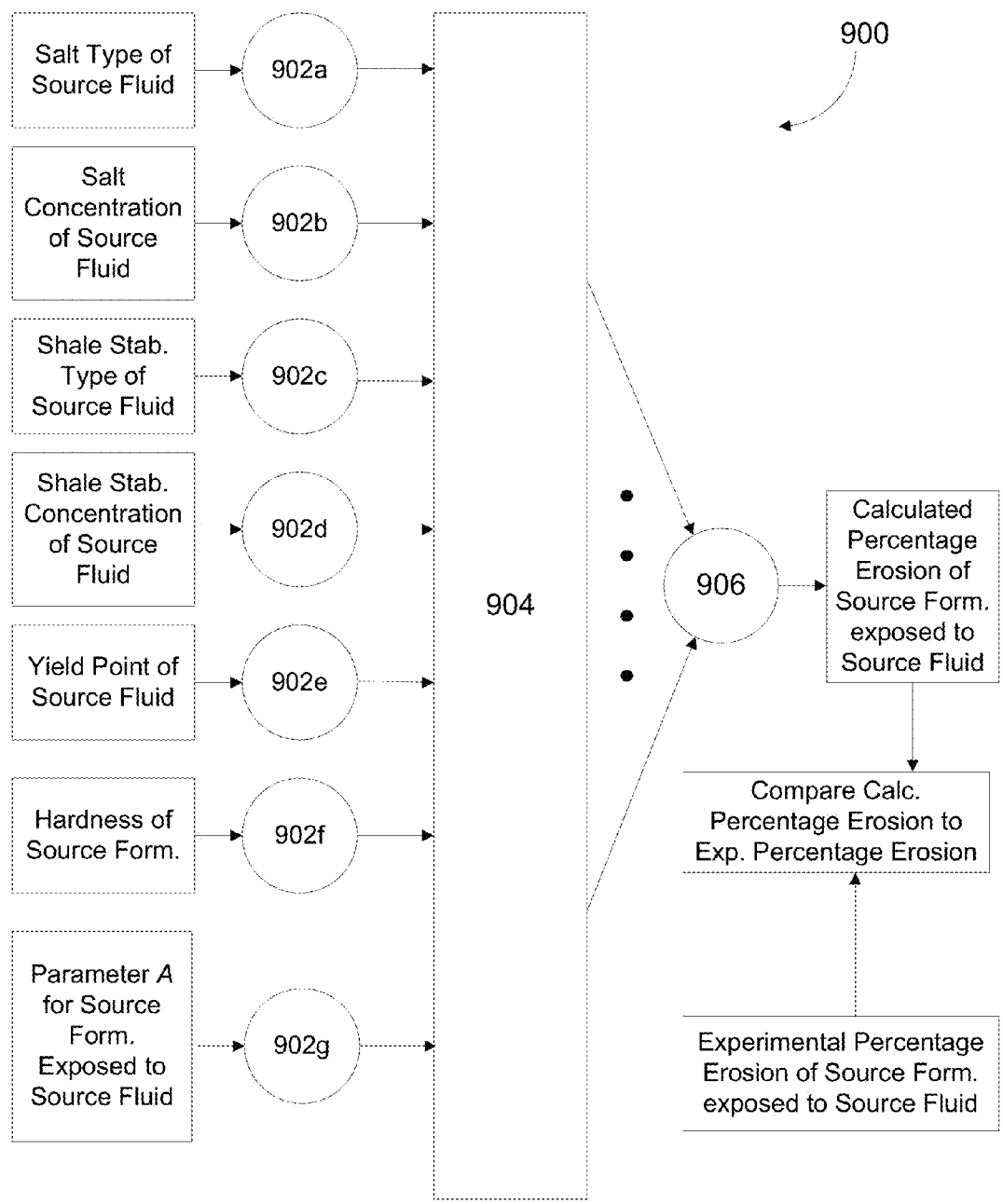
FIG. 9a illustrates an example method for training an artificial neural network to generate a formation/fluid interaction parameter, according to aspects of the present disclosure.

In certain other embodiments, an ANN may be trained to determine the percentage erosion (or percentage shale recovery) of a target shale formation when it is exposed to a target drilling fluid. For example, as can be seen in FIG. 9a, ANN 900 may receive at input neurons 902a-e characteristics of the source drilling fluid comprising salt type, salt concentration, shale stabilizer type, shale stabilizer concentration, and yield point. The ANN 900 may also receive at input neurons weighting agent type and weighting agent concentration. In addition, ANN 900 may receive at input neurons 902f-g a characteristic of the source shale formation, such as hardness, as well as a formation/fluid interaction value, such as a maximum swelling value parameter A from equation [1]. Notably, the parameter A may be either experimentally determined using an LSM, or calculated using a trained ANN. Each of the source formation characteristics, the source drilling fluid characteristics, and the formation/fluid interaction value may be included in a training data set for the percentage erosion, as can be seen in FIG. 9b. The training data set for the percentage erosion may also include an experimentally determined value of the percentage erosion, as described above, for each source formation/source drilling fluid combination in the training data. Layer 904 may include hidden neurons with parallel connections, similar to those shown in FIG. 1. For each set of inputs, the ANN 900 may output a calculated percentage erosion at output neuron 906. The calculated percentage erosion may be compared with the experimentally determined percentage erosion from the training data set to identify accurate neuron weight. In certain embodiments, ANN 600, ANN 800, and ANN 900 may be the same ANN, with the ANN calculating to appropriate parameter depending on the input neurons receiving input data.

Though the modeling described above correspond to fluid with a single salt type, different salts can be used. Alternatively a mixture of salts can be used. Likewise, certain fluid and formation properties, such as the CEC of a formation, may be determined using different tests and methods, as would be appreciated by one of ordinary skill in the art in view of this disclosure. Likewise shale swelling responses for particular shale formations can be determined using test apparatuses and methods other than the LSM.

Figure 9C:
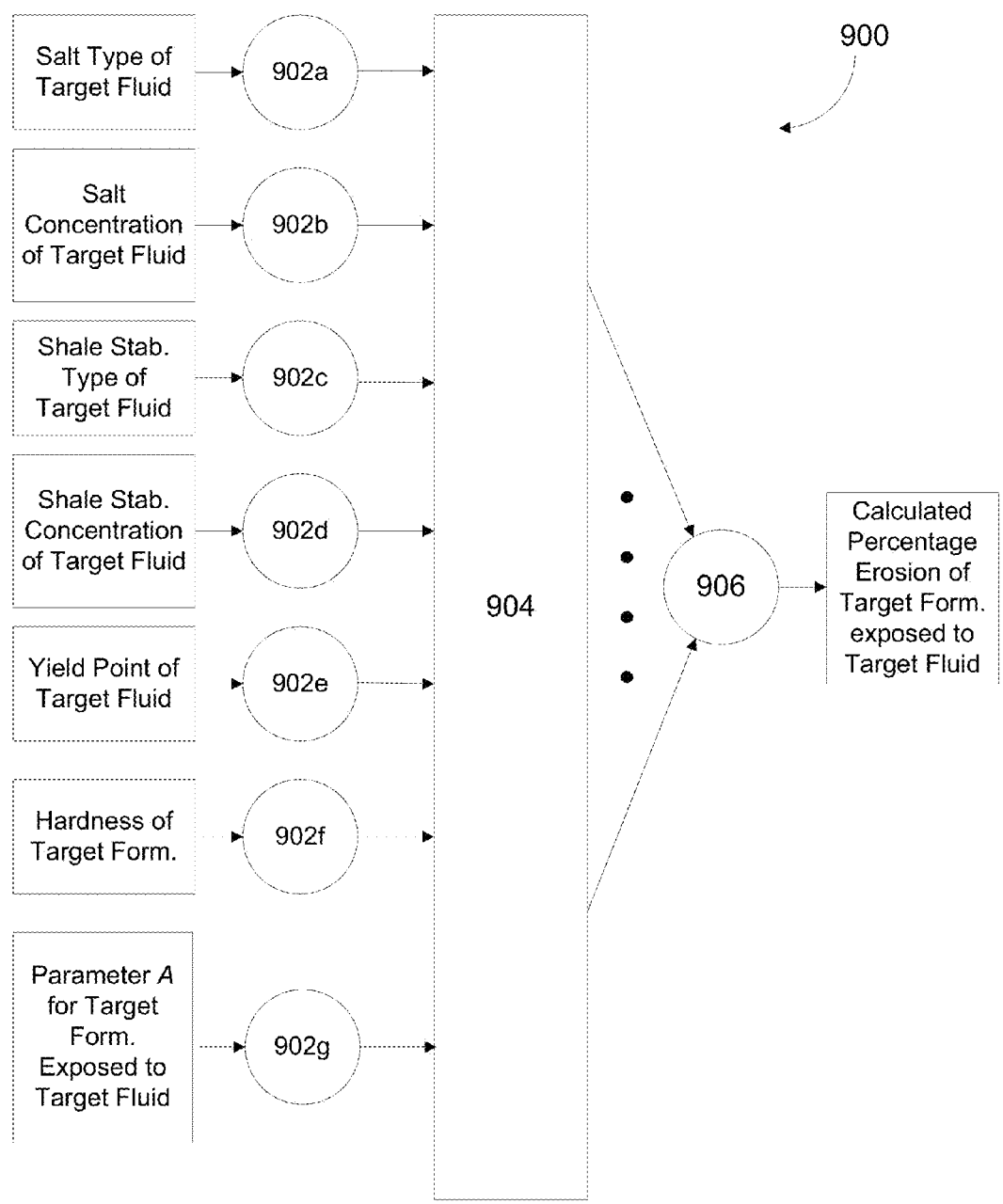
FIG. 9c illustrates a method for generating a formation/fluid interaction parameter of a target formation exposed to a target drilling fluid, according to aspects of the present disclosure.

Once the ANN 900 has been trained using the training data set for percentage erosion, the ANN 900 can be used to calculate the percentage erosion for a target formation and a target drilling fluid. As can be seen in FIG. 9c, characteristics of the target formation and drilling fluid, as well as the formation/fluid interaction value, corresponding to the characteristics of the source formation and drilling and formation/fluid interaction value used to train the ANN may be input into neurons 902a-g, as described above with respect to ANN 600. Once the characteristics are input, the output node 906 of the ANN 900 may output percentage erosion corresponding to the target formation and target drilling fluid. Advantageously, by altering the parameters of the target drilling fluid input to the ANN 900 (and adjusting the value of parameter A accordingly), the target drilling fluid can be optimized in real time.

Advantageously, once the ANN is trained to model particular formations and calculate values parameters A and B of equation [1], and the percentage erosion of a particular target formation/target drilling fluid combination, the ANN can be used to optimize target drilling fluids. For example, during drilling operations, naturally occurring shale formations are found. The shale can be analyzed to determine the shale characteristics required as inputs to a trained ANN. Additionally, the characteristics of different target fluids may be input to the ANN. The ANN may calculate the parameters A and B, as well as the percentage erosion, for each formation/target fluid combination, and the target fluid that minimizes the swelling response of the naturally occurring shale formation may be selected. Advantageously, each calculation may be run in real time, and the target drilling fluid characteristics may be changed easily until the target drilling fluid is optimized. In contrast, optimizing a drilling fluid using current testing techniques may take days.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A method for training an artificial neural network to model shale characteristics, comprising:
   determining a first characteristic of a source formation;
   determining a second characteristic of a source drilling fluid;
   determining an experimental formation/fluid interaction of the source formation and the source drilling fluid, wherein determining the experimental formation/fluid interaction comprises determining an experimental value for a swelling response of the source formation at least in part by fitting the following equation to the swelling response:

$$\% S(t) = A(1 - 1/(e^{(Bt)} + C\sqrt{t}));$$

wherein % S(t) represents the swelling of the source formation at a time t, A represents the maximum swelling of the sample formation, B represents a first-order rate of swelling, and C represents a filtrate loss parameter;
   inputting the first characteristic and the second characteristic into the artificial neural network;
   receiving from the artificial neural network a calculated formation/fluid interaction of the source formation and the source drilling fluid;
   comparing the calculated formation/fluid interaction to the experimental formation/fluid interaction; and
   altering an internal weight of the artificial neural network based, at least in part, on the comparison between the calculated formation/fluid interaction and the experimental formation/fluid interaction.

2. The method of claim 1, wherein the first characteristic comprises at least one of Smectite content, Illite content, Kaolin content, Chlorite content, Quartz content, Total Clay content, exchangeable Sodium content, exchangeable Calcium content, exchangeable Potassium content, exchangable Magnesium content, Cation Exchange Capacity, and Hardness parameter.

3. The method of claim 1, wherein receiving from the artificial neural network a calculated formation/fluid interaction includes receiving a calculated value of at least one of the parameters A, B, and C.

4. The method of claim 1, wherein the second characteristic includes at least one of a fluid Rheological parameter, a shale stabilizer type, a shale stabilizer concentration, a salt type, a salt concentration, a water concentration, and a weighting agent type and weighting agent concentration.

5. The method of claim 1, wherein determining the experimental formation/fluid interaction comprises determining an experimental value of a percentage shale recovery of the source formation using a shale erosion test.

6. The method of claim 5, wherein receiving the calculated formation/fluid interaction includes receiving from the artificial neural network a calculated value of the percentage shale recovery.

7. A method for determining a formation/fluid interaction of a target formation, comprising:
   training an artificial neural network using a training data set, wherein the training data set comprises a shale characteristic of a source shale formation, a fluid characteristic of a source drilling fluid, and an experimental source formation/fluid interaction;
   inputting into a first node of the artificial neural network a shale characteristic of the target shale formation, wherein the shale characteristic of the target shale formation corresponds to the shale characteristic of the source shale formation;
   inputting into a second node of the artificial neural network a fluid characteristic of the target drilling fluid, wherein the fluid characteristic of the target shale formation corresponds to the fluid characteristic of the source drilling fluid;
   determining a calculated formation/fluid interaction of the target shale formation and the target drilling fluid using a value output by the artificial neural network, wherein the value output by the artificial network is at least one of the parameters A, B, and C of the following equation:

$$\% \ S(t)=A(1-1/(e^{\wedge}(Bt)+C\sqrt{t}));$$

wherein % S(t) represents a swelling response of a shale formation at a time t, A represents the maximum swelling of the shale formation, B represents the first-order rate of swelling, and C represents the filtrate loss parameter; and altering at least one fluid characteristic of the target drilling fluid, based, at least in part, on the calculated formation/fluid interaction.

8. The method of claim 7, wherein the shale characteristic of the target formation comprises at least one of Smectite content, Elite content, Kaolin content, Chlorite content, Quartz content Total Clay content, exchangeable Sodium content, exchangeable Calcium content, exchangeable Potassium content, exchangeable Magnesium content, Cation Exchange Capacity, and Hardness parameter.

9. The method of claim 7, wherein the fluid characteristic of the target drilling fluid includes at least one of a fluid Rheological parameter, a shale stabilizer type, a shale stabilizer concentration, a salt type, a salt concentration, a water concentration, and a weighting material type and weighting agent concentration.

10. The method of claim 7, wherein determining the calculated formation/fluid interaction includes determining the swelling response of the target shale formation using the equation.

11. The method of claim 7, further comprising the step of inputting into a third node of the artificial neural network a maximum swelling value for the target shale formation.

12. The method of claim 7, wherein the calculated formation/fluid interaction comprises a percentage shale recovery of the target shale formation when the target shale formation is exposed to the target drilling fluid.

13. The method of claim 7, wherein the at least one fluid characteristic of the target drilling fluid includes a salt content of the target drilling fluid.

14. The method of claim 13, further comprising the step of introducing the altered target drilling fluid into a borehole.

15. An apparatus for determining a formation/fluid interaction of a target formation, comprising:

at least one processor;
at least one memory element coupled to the processor, wherein at least one software element is operable to cause the at least one processor to:
receive a training data set, wherein the training data set comprises a shale characteristic of a source shale formation, a fluid characteristic of a source drilling fluid, and an experimental source formation/fluid interaction;
receive as a first input a shale characteristic of the target shale formation, wherein the shale characteristic of the target shale formation corresponds to the shale characteristic of the source shale characteristic;
receive as a second input a fluid characteristic of the target drilling fluid, wherein the fluid characteristic of the target drilling fluid corresponds to the fluid characteristic of the source drilling fluid;
calculate a formation/fluid interaction of the target shale formation when the target shale formation is exposed to the target drilling fluid, using at least one of the parameters A, B, and C of the following equation:

$$\% \ S(t)=A(1-1/(e^{\wedge}(Bt)+C\sqrt{t}));$$

wherein % S(t) represents a swelling response of a shale formation at a time t, A represents the maximum swelling of the shale formation, B represents the first-order rate of swelling, and C represents the filtrate loss parameter;
determine at least one characteristic of the target drilling fluid to modify to optimize the target drilling fluid; and
alter at least one fluid characteristic of the target drilling fluid, based, at least in part, on the calculated formation/fluid interaction.

16. The apparatus of claim 15, wherein the formation/fluid interaction comprises a swelling response of the target shale formation when the target shale formation is exposed to the target drilling fluid.

17. The apparatus of claim 15, wherein the formation/fluid interaction comprises a percentage shale recovery of the target shale formation when the target shale formation is exposed to the target drilling fluid.

* * * * *